US012541185B2

United States Patent
Prestileo et al.

(10) Patent No.: US 12,541,185 B2
(45) Date of Patent: Feb. 3, 2026

(54) CONTROL SYSTEM FOR CONTROLLING ONE OR MORE TAPPING VALVES OF A BEVERAGE DISPENSER

(71) Applicant: CELLI S.P.A., Rimini (IT)

(72) Inventors: Andrea Prestileo, Rimini (IT); Fabrizio Faraci, Rimini (IT); Roberto Castelli, Rimini (IT); Cesare Schiatti, Rimini (IT)

(73) Assignee: CELLI S.P.A., Rimini (IT)

( * ) Notice: Subject to any disclaimer, the term of this patent is extended or adjusted under 35 U.S.C. 154(b) by 526 days.

(21) Appl. No.: 18/147,273

(22) Filed: Dec. 28, 2022

(65) Prior Publication Data
US 2023/0213910 A1 Jul. 6, 2023

(30) Foreign Application Priority Data

Dec. 30, 2021 (IT) .................... 102021000033128

(51) Int. Cl.
*G06F 21/44* (2013.01)
*B67D 1/12* (2006.01)
*G05B 19/042* (2006.01)
*G06F 8/71* (2018.01)
*G06F 9/54* (2006.01)
*B67D 1/00* (2006.01)

(52) U.S. Cl.
CPC ............. *G05B 19/042* (2013.01); *B67D 1/12* (2013.01); *B67D 2001/0093* (2013.01)

(58) Field of Classification Search
CPC .............................. G05B 19/042; B67D 1/12; B67D 2001/0093; B67D 1/1405; B67D 2001/1483; B67D 2210/00089; B67D 1/0888; G06F 21/44; G06F 8/71; G06F 9/54
See application file for complete search history.

(56) References Cited

U.S. PATENT DOCUMENTS

2017/0111336 A1* 4/2017 Davis ................. H04L 67/10
2017/0313568 A1* 11/2017 Kelly ................. B67D 1/0888
(Continued)

FOREIGN PATENT DOCUMENTS

EP 3248933 A1 11/2017
WO WO 2021/211798 A1 10/2021

OTHER PUBLICATIONS

Italian Search Report received in Italian Application No. 102021000033128 dated Aug. 3, 2022 in 13 pages.

*Primary Examiner* — Thomas C Lee
*Assistant Examiner* — Michael V Farina
(74) *Attorney, Agent, or Firm* — Maier & Maier, PLLC

(57) ABSTRACT

A control system for controlling one or more tapping valves included in a beverage dispenser includes a telematic communication network with a cloud server and a gateway for selecting a tapping valve and connecting the telematics communication network to the selected tapping valve. The cloud server is configured to send a control signal to the gateway and the gateway is configured to verify which tapping valve the control signal is directed to and forward the control signal to the tapping valve. The control logic unit of each tapping valve is configured to receive the control signal and execute a command and/or modify one or more parameters of a set of parameters and/or add one or more further parameters to the set of parameters.

10 Claims, 2 Drawing Sheets

(56) References Cited

U.S. PATENT DOCUMENTS

| | | |
|---|---|---|
| 2019/0012498 A1 | 1/2019 | Mahncke |
| 2020/0249660 A1 | 8/2020 | Rao et al. |
| 2021/0109552 A1* | 4/2021 | Chatelet .................. E21B 34/16 |
| 2021/0179412 A1* | 6/2021 | Chang ..................... G07F 9/002 |
| 2021/0221667 A1 | 7/2021 | Venkatakrishanan et al. |
| 2021/0362993 A1* | 11/2021 | Shafir .................... G06Q 30/06 |
| 2022/0371875 A1* | 11/2022 | Cortland .............. B67D 1/1202 |

* cited by examiner

|  | $V_1$ | $V_2$ |
|---|---|---|
| Set of parameters | $PS_1$ | $PS_2$ |
| Serial number | $SN_1$ | $SN_2$ |
| MAC address | $M_1$ | $M_2$ |
| Pairing key | $K_1$ | $K_2$ |

CONTROL SYSTEM FOR CONTROLLING ONE OR MORE TAPPING VALVES OF A BEVERAGE DISPENSER

CROSS-REFERENCE TO RELATED APPLICATIONS

This application claims priority to Italian Patent Application No. 102021000033128, filed on Dec. 30, 2021, which is incorporated herein by reference in its entirety.

TECHNICAL FIELD

The disclosure relates to a control system for controlling one or more tapping valves of a beverage dispenser.

In particular, the disclosure relates to the structure of said control system which allows a remote operator to safely control one or more tapping valves of a beverage dispenser, wherein each tapping valve is designed to dispense a respective beverage.

The expression "controlling a tapping valve" means the possibility of giving a command to a tapping valve and/or the possibility of controlling a set of parameters associated with said tapping valve, for example to modify one or more parameters of said set of parameters and/or add one or more further parameters to said set of parameters.

More particularly, the beverage dispenser comprises at least one first tapping valve and a second tapping valve, connected or connectable to the first tapping valve, and the control system comprises an electronic selection and connection device called gateway and a telematic (or telematics) communication network connectable (only) to said gateway and configured to send one or more control signals (only) to said gateway, irrespective of whether said control signals are directed to the first tapping valve or to the second tapping valve.

It is preferable that the first tapping valve is provided with said gateway. In this specific case, the first tapping valve behaves as a primary tapping valve or master tapping valve, i.e. a tapping valve configured to control the second tapping valve, and the second tapping valve behaves as a secondary tapping valve or slave tapping valve, i.e. a tapping valve configured to be controlled by the first tapping valve.

In the following description, reference will be made to a control system for controlling two tapping valves included in a beverage dispenser.

However, with the same advantages, the control system can control a number of tapping valves more than two.

BACKGROUND

It is currently known that a beverage dispenser can be provided with one or more dispensing valves.

A tapping valve is designed to dispense a beverage manually or automatically.

A set of parameters is associated with a tapping valve.

It is often necessary to give a command to said tapping valve and/or to modify the values of one or more parameters of said set of parameters and/or to add one or more further parameters to said set of parameters.

Consequently, it is necessary to communicate with each tapping valve of said beverage dispenser.

A control system of known type comprises a telematic communication network and each tapping valve of a beverage dispenser is configured to communicate with said telematic communication network.

A drawback of said control system is given by the need for each tapping valve to be provided with a respective transceiver device (such as for example a modem) to send/receive signals to/from said telematic communication network.

Consequently, a further disadvantage is given by the cost of purchasing a plurality of tapping valves, each of which needs to be provided with a respective transceiver device to communicate with said telematic telecommunication network.

SUMMARY

It is an aim of the disclosure to overcome said disadvantage, providing a control system for controlling one or more tapping valves of a beverage dispenser, wherein said control system has a simple structure and a low construction cost and is designed to guarantee a secure communication between a telematic communication network and said one or more tapping valves.

A further aim of the disclosure is to provide a control system configured in such a way that, irrespective of the number of tapping valves, said telematic communication network can be connected to the first tapping valve and to the second tapping valve by means of an electronic selection and connection device called gateway, preferably arranged in the first tapping valve, configured to receive the control signal sent by the telematic communication network, verify which is the tapping valve to which said control signal is directed and forward said control signal to said tapping valve.

Consequently, the control system is designed so that the information between said telematic communication network and each tapping valve is always exchanged through said gateway, which is the only connection element for connecting the telematic communication network to the tapping valves.

A further aim of the disclosure is to provide a control system in which the information contained in the control signal is recognized only by the tapping valve to which the control signal is directed.

Consequently, although the gateway receives the control signal which may be directed to the first tapping valve or to the second tapping valve, it is not possible for said gateway to know the information contained in said control signal. It is therefore object of the some embodiments of the disclosure a control system for controlling one or more tapping valves included in a beverage dispenser, wherein said beverage dispenser is of the type comprising a plurality of tapping valves comprising at least one first tapping valve and a second tapping valve, wherein said first tapping valve comprises a first control logic unit and first storage means in which at least one unique identification code associated with said first tapping valve and a first set of parameters are stored, and said second tapping valve comprises a second control logic unit and second storage means in which at least one second unique identification code associated with said second tapping valve and a second set of parameters.

Said control system comprises:
  a telematic communication network comprising a cloud server comprising in turn a control logic unit and storage means in which at least one said first unique identification code and said second unique identification code are stored, and
  a selecting and connecting electronic device called gateway, for selecting said first tapping valve or said second tapping valve and connecting said telematics communication network to said first tapping valve or to said second tapping valve, The control logic unit of said cloud server to:

send a control signal to said gateway, regardless of whether said control signal is directed to said first tapping valve or to said second tapping valve, wherein said control signal contains:

a data packet comprising the following data:
  at least one data referred to said first unique identification code, one or more data of the following data group: a first command for the first tapping valve, one or more data referred to respective parameters to be modified, one or more data referred to respective further parameters to be added to said first set of parameters, or a further data packet comprising the following data:
  at least one data referred to said second unique identification code, one or more data of the following data group:
  a data referred to a second command for the second tapping valve, one or more data referred to respective parameters to be modified, one or more data referred to respective further parameters to be added to said second set of parameters.

Said gateway comprises a further control logic unit configured to:

verify if said control signal is directed to said first tapping valve through said first unique identification code or to said second tapping valve through said second unique identification code, and forward said control signal to said first tapping valve or to said second tapping valve based on the outcome of the verification of the unique identification code.

The first control logic unit of said first tapping valve is configured to:

receive said control signal sent by the control logic unit of said cloud server through said gateway, and perform said first command and/or modify one or more parameters of the first set of parameters and/or add one or more further parameters to said first set of parameters.

The second control logic unit of said second tapping valve is configured to:

receive said control signal sent by the control logic unit of said cloud server through said gateway, and perform said second command and/or modify one or more parameters of the second set of parameters and/or add one or more further parameters to said second set of parameters.

Further preferred embodiments are disclosed in the dependent claims.

BRIEF DESCRIPTION OF THE DRAWINGS

The present disclosure will be now described, for illustrative, but not limitative purposes, according to its embodiments, making particular reference to the enclosed figures, wherein:

FIG. 3 shows a table of data referring to each tapping valve.

In the various figures, similar parts will be indicated with the same reference numbers.

DETAILED DESCRIPTION

Figure 1:
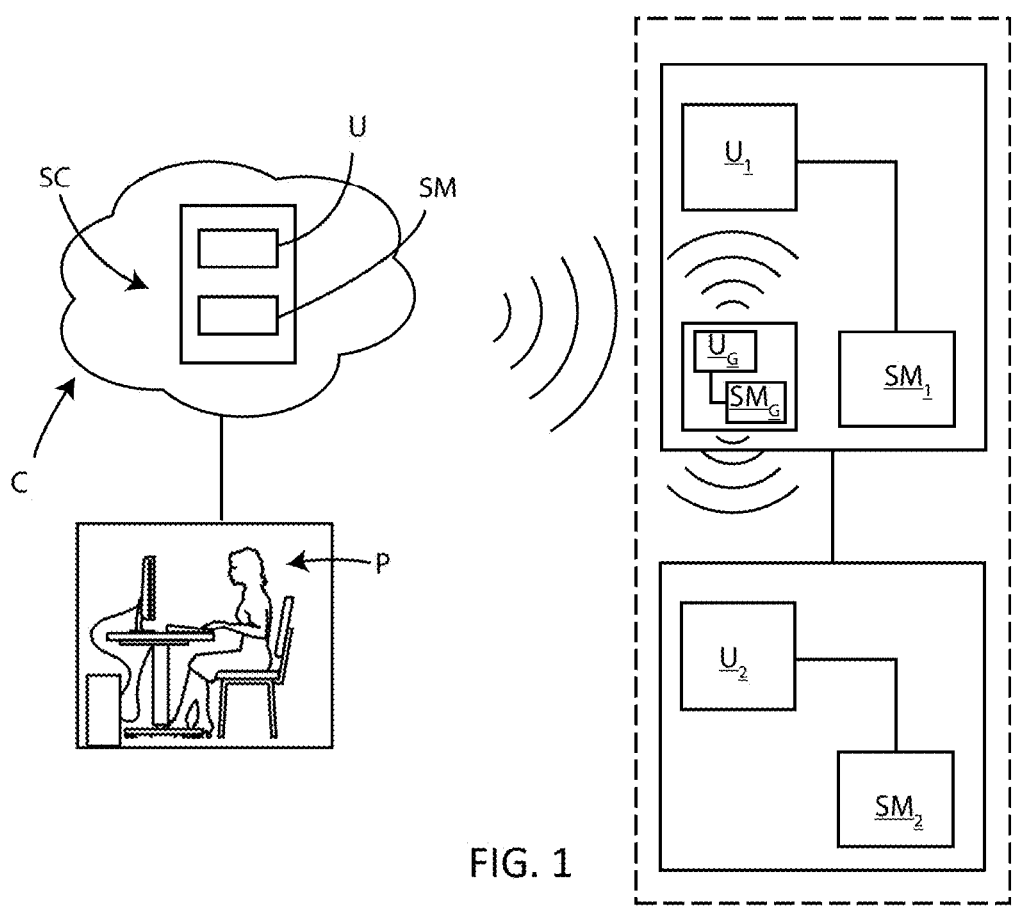
FIG. 1 is a schematic view of a control system, according to the disclosure, configured to control two tapping valves of a beverage dispenser.
Figure 2:
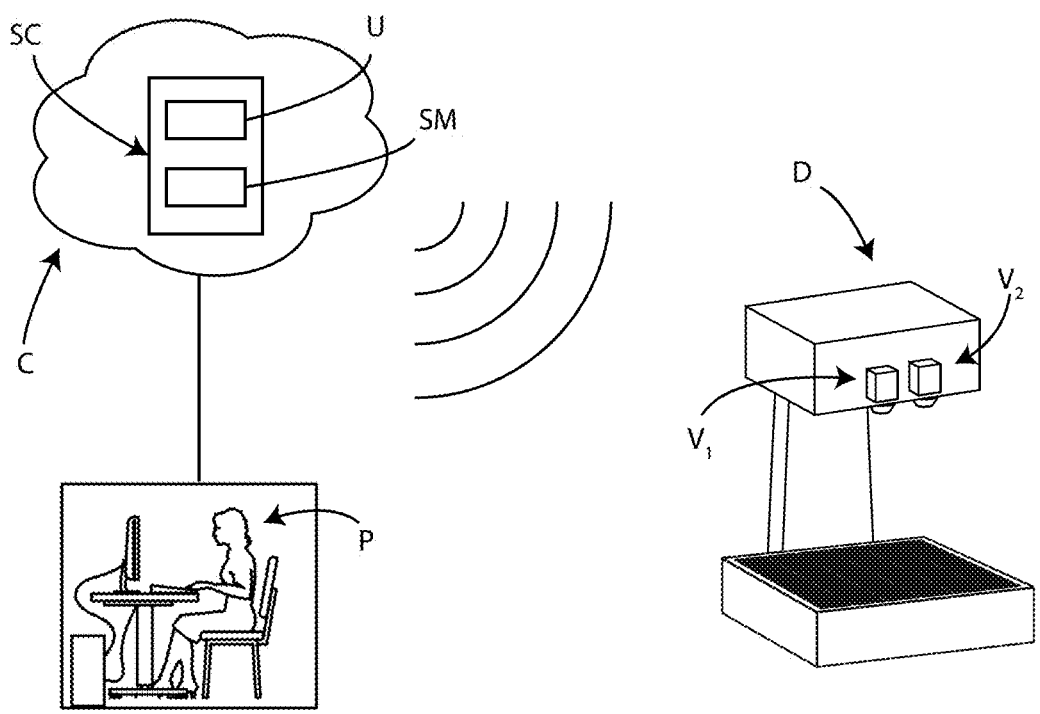
FIG. 2 is a schematic view similar to the schematic view of FIG. 1 showing a beverage dispenser in which two dispensing valves are installed.

With reference to FIGS. 1-3 a control system according to the disclosure is disclosed Said control system is configured to control one or more tapping valves installed on a beverage dispenser for tapping a respective beverage.

In the embodiment being disclosed, the control system is configured to control one or more tapping valves of a plurality of tapping valves of a beverage dispenser, wherein said plurality of tapping valves comprises a first tapping valve $V_1$ and a second tapping valve $V_2$.

The two tapping valves $V_1$, $V_2$ are installed on a beverage dispenser indicate with reference D.

Consequently, it is possible to tap a first beverage, through the first tapping valve $V_1$, and a second possible beverage, through the second tapping valve $V_2$.

Said first beverage and said second beverage can be different from each other or equal to each other.

At least one first unique identification code is associated with the first tapping valve $V_1$ and at least a second unique identification code is associated with the second tapping valve $V_2$.

In the embodiment being disclosed, two respective unique identification codes are associated with each tapping valve:
  a first unique identification code which a first serial number $SN_1$ and a further first unique identification code which is a first MAC address $M_1$ are associated with the first tapping valve $V_1$;
  a second unique identification code which is a second serial number $SN_2$ and a further second unique identification code which is a second MAC address $M_2$ are associated with the second tapping valve $V_2$.

However, two identification codes associated with the same tapping valve are not necessary.

It is sufficient that a single unique identification code is associated with each tapping valve and said unique identification code can be the serial number or the MAC address.

With reference to the two tapping valves $V_1$, $V_2$ mentioned above, the control system allows to give a first command to the first tapping valve $V_1$ and/or to control a first set of parameters $PS_1$ associated with said first tapping valve $V_1$, or to give a second command to the second tapping valve $V_2$ and/or to control a second set of parameters $PS_2$ associated with said second tapping valve $V_2$.

With reference to the first command, said first command causes the execution of an action performed by the first tapping valve $V_1$, such as the opening or closing of said first tapping valve $V_1$.

With reference to the parameters of the first set of parameters $PS_1$, said parameters relate to the first beverage to be dispensed through the first tapping valve $V_1$ and can be for example: a numerical value associated with a quantity of a first liquid, wherein said first liquid is water or soda, a numerical value associated with a quantity of a second liquid, wherein said second liquid is a syrup, to be mixed with said quantity of said first liquid to form said first beverage (when the first beverage is obtained through a mixture of liquids), a numerical value associated with the ratio between said quantity of said first liquid and said quantity of said second liquid, a numerical value associated with the opening time of said first tapping valve $V_1$, a numerical value associated with the closing time of said first tapping valve $V_1$, a numeric value associated with the time interval in which said first tapping valve $V_1$ is to be kept open, a numerical value associated with the time interval wherein said first tapping valve $V_1$ is to be kept closed, etc.

With reference to the second command, said second command causes the execution of an action performed by the second tapping valve $V_2$, such as the opening or closing of said second tapping valve $V_2$.

With reference to the parameters of the second set of parameters $PS_2$, said parameters relates to the second beverage to be dispensed through the second tapping valve $V_2$ and can be for example: a numerical value associated with a quantity of a further first liquid, wherein said further first liquid is water or soda, a numerical value associated with a quantity of a further second liquid, wherein said further second liquid is a syrup, to be mixed with said quantity of said further first liquid to form said second beverage (when the second beverage is obtained through a mixture of liquids), a numerical value associated with the ratio between said quantity of said further first liquid and said quantity of said further second liquid, a numerical value associated with the opening time of said second tapping valve $V_2$, a numerical value associated with the closing time of said second tapping valve $V_2$, a numerical value associated with the time interval in which said second tapping valve $V_2$ is to be kept open, a numerical value associated with the time interval in which said second tapping valve $V_2$ is to be kept closed, etc.

Although not shown in Figures, said control system can be configured to control a number of tapping valves greater than two, without departing from the scope of disclosure.

With reference to the beverage dispenser D, said beverage dispenser D can be placed in any geographical area in the world and, in particular, in any site within said geographical area.

Said site can be a bar or any environment in which a beverage dispenser D can be placed.

With reference to the beverage dispenser D, said tapping valve $V_2$ is connected or connectable to said first tapping valve $V_1$.

Each tapping valve $V_1$, $V_2$ comprises a respective control logic unit $U_1$, $U_2$ and respective storage means $SM_1$, $SM_2$.

Said control system further comprises a telematic communication network C to send a control signal and a selecting and connecting electronic device G called gateway for selecting the first tapping valve $V_1$ or the second tapping valve $V_2$ and for connecting the telematics communication network C to the selected tapping valve (i.e. the tapping valve intended to receive the control signal).

With reference to the telematic communication network C, said telematic communication network C comprises a cloud server SC, a control logic unit U and storage means SM.

Said at least one unique identification code associated with the first tapping valve $V_1$ and said at least a second unique identification code associated with the second tapping valve $V_2$ are stored in said in said storage means SM.

The control logic unit U of the cloud server SC is configured to:
send a control signal to said first tapping valve $V_1$ or to said second tapping valve $V_2$ through said gateway G.
Said control signal contains:
a data packet comprising the following data:
at least one data referred to said first unique identification code, ore or more data of the following data group: a first command for the first tapping valve $V_1$, one or more data referred to respective parameters to be modified, one or more data referred to respective further parameter to be added to said first set of parameters $SP_1$ (when the control signal is directed to the first tapping valve $V_1$), or
a further data packet comprising the following data:
at least one data referred to said second unique identification code, one or more data of the following data group: a data referred to a second command for the second tapping valve $V_2$, one or more data referred to respective parameters to be modified, one or more data referred to respective further parameters to be added to said second set of parameters $SP_2$ (when the control signal is directed to the second tapping valve $V_2$).

The control logic unit U of said cloud server SC is configured to send a control signal (only) to said gateway G, irrespective of whether said control signal is directed to the first tapping valve $V_1$ or to the second tapping valve $V_2$.

With reference to the gateway G, said gateway G comprises a further control logic unit $U_G$ configured to:
verify if said control signal is directed to said first tapping valve $V_1$ through said first unique identification code or to said second tapping valve $V_2$ through said second unique identification code, and
forward said control signal to said first tapping valve $V_1$ or to said second tapping valve $V_2$ based on the outcome of the verification of the unique identification code.

The first control logic unit $U_1$ of the first tapping valve $V_1$ is configured to:
receive the control signal sent by the control logic unit U of said cloud server SC through said gateway G, and
perform said first command and/or modify one or more parameters of the first set of parameters $PS_1$ and/or add one or more further parameters to said first set of parameters $PS_1$.

The second control logic unit $U_2$ of the second tapping valve $V_2$ is configured to:
receive said control signal sent by the control logic unit U of said cloud server SC through said gateway G, and
perform said second command and/or modify one or more parameters of the second set of parameters $PS_2$ and/or add one or more further parameters to said second set of parameters $PS_2$.

Advantageously, embodiments of the disclosure, allow an operator P to remotely connect (via said telematic communication network C) to the tapping valves V1, V2 of the beverage dispenser D to control each of said tapping valves independently of each other, without the need for said operator P to be in the same site where the beverage dispenser D is placed.

Regardless of whether the control signal sent by the cloud server SC is directed to the first tapping valve $V_1$ or to the second tapping valve $V_2$, said control signal reaches the gateway G.

The further control logic unit of the gateway G verifies to which tapping valve said control signal is directed and forwards said control signal to the tapping valve which is intended to receive the control signal.

In the embodiment being disclosed, said gateway G is installed on said first tapping valve $V_1$.

Consequently, said first tapping valve $V_1$ is a primary tapping valve or master tapping valve and the second tapping valve $V_2$ is a secondary tapping valve or a slave tapping valve.

In fact, the second tapping valve $V_2$ is a tapping valve controlled by the first tapping valve $V_1$ according to the information contained in the control signal sent by the cloud server SC to the gateway G and directed to the second tapping valve $V_2$.

In order to establish a connection between each tapping valve $V_1$, $V_2$ and the gateway G, a first pairing key $K_1$ and a second pairing key $K_2$, different from said first pairing key $K_1$, are stored in the storage means SM of the cloud server SC.

The first pairing key $K_1$ serves to establish a connection between the first tapping valve $V_1$ and gateway G and the second pairing key $K_2$ serves to establish a connection between the second tapping valve $V_2$ and gateway G.

Said gateway G comprises further storage means $SM_G$ and said further control logic unit $U_G$ of said gateway G is configured to:
- send a request signal to said cloud server SC to obtain said first pairing key $K_1$ and said second pairing key $K_2$,
- receive a request signal sent from said cloud server SC, wherein said request signal contains said first pairing key $K_1$ and said second pairing key $K_2$,
- establish a connection between said gateway G and the first control logic unit $U_1$ of the first tapping valve $V_1$ through said first pairing key $K_1$ and establish a connection between said gateway G and the second control logic unit $U_2$ of the second tapping valve $V_2$ through said second pairing key $K_2$.

Said control logic unit U of said cloud server SC is configured to:
- receive said request signal sent from said gateway G,
- send to said gateway G said request signal containing said first pairing key $K_1$ and said second pairing key $K_2$.

In view of the above, the control system is designed in such a way that the control logic unit U of the cloud server SC is configured to send control signals and response signals to the gateway G, which, as mentioned, in the form of embodiment being described, is arranged in the first tapping valve $V_1$.

In the embodiment being disclosed, the connection between said gateway G and said first tapping valve $V_1$ and the connection between said gateway G and said second tapping valve $V_2$ are wireless connections.

In particular, each wireless connection is a bluetooth connection.

Furthermore, said further control logic unit $U_G$ of said gateway G is configured to store in said further storage means $SM_G$ the data of said data packet and the data of said further data packet, when it receives said control signal from said cloud server SC.

With reference to the first tapping valve $V_1$, a first unlock code can be stored in said first storage means $SM_1$ of said first tapping valve $V_1$.

Said first unlock code serves to enable said first tapping valve $V_1$ to receive one or more predetermined first commands from said cloud server SC.

With reference to the second tapping valve $V_2$, a second unlock code can be stored in said second storage means $SM_2$ of said second tapping valve $V_2$.

Said second unlock code serves to enable said second tapping valve $V_2$ to receive one or more predetermined second commands from said cloud server SC.

In one example, the typing of the first unlock code by an operator at the site where the beverage dispenser D is placed can enable the first tapping valve $V_1$ to receive a control signal sent by the cloud server SC so that the first tapping valve $V_1$ dispenses the first beverage $B_1$.

In said example, the predetermined command performed by the first tapping valve $V_1$ is the dispensing of the first beverage $B_1$.

However, the predetermined command can be different from the dispensing of the first beverage.

The same considerations can be applied to the second tapping valve $V_2$ and to the second unlock code.

Furthermore, said control signal is an encrypted signal.

A first decryption key for decrypting said control signal is stored in the first storage means $SM_1$ of the first tapping valve $V_1$, and a second decryption key for decrypting said control signal, different from said first decryption key, is stored in the second storage means $SM_2$ of the second tapping valve $V_2$.

Said first decryption key and said second decryption key are also stored in the storage means SM of the cloud server SC.

The first control logic unit $U_1$ of the first tapping valve $V_1$ is configured to decrypt said control signal by means of said first decryption key (when the control signal is directed to the first tapping valve $V_1$).

The second control logic unit $U_2$ of the second tapping valve $V_2$ is configured to decrypt said control signal by means of said second decryption key (when the control signal is directed to the second tapping valve $V_2$).

A digital twin associated with said beverage dispenser D can be stored in said storage means SM of said cloud server SC.

The expression "digital twin" means a virtual representation of a physical entity or a process.

In the specific case, the expression "digital twin" means the virtual representation of a physical entity that is the beverage dispenser.

The present disclosure also relates to a method for creating a digital twin associated with a beverage dispenser D comprising a control system mentioned above.

The method for creating a digital twin associated with a beverage dispenser D comprises the following steps:

A) storing in said storage means SM the following data:
- one or more geographical areas $A_1, A_2 \ldots A_N$ (wherein N is a positive integer number),
- for each geographical area $A_1, A_2 \ldots A_N$ one or more respective sites $S_{11}, S_{12} \ldots S_{1M}$; $S_{21}, S_{22} \ldots S_{2M}$; $S_{N1}, S_{N2} \ldots S_{NM}$) in which at least a beverage dispenser D is placed, and
- a plurality of beverages $B_1, B_2 \ldots B_J$ (wherein J is a positive integer number), different from each other;

B) selecting:
- a geographical area between the geographical areas $A_1, A_2 \ldots A_N$ stored in said storage means SM and/or a site between the sites $S_{11}, S_{12} \ldots S_{1M}$; $S_{21}, S_{22} \ldots S_{2M}$; $S_{N1}, S_{N2} \ldots S_{NM}$ stored in said storage means SM associated with the selected geographical area, and
- storing in said storage means SM a data concerning said selected geographical area $A_1, A_2 \ldots A_N$ and/or a data concerning said selected site $S_{11}, S_{12} \ldots S_{1M}$; $S_{21}, S_{22} \ldots S_{2M}$; $S_{N1}, S_{N2} \ldots S_{NM}$;

C) selecting a first beverage $B_1$ between said plurality of beverages $B_1, B_2 \ldots B_J$;

D) associating said first beverage $B_1$ with said first tapping valve $V_1$ and storing in said storage means SM a data concerning said first beverage $B_1$ associated with said first tapping valve $V_1$;

E) selecting a second beverage $B_2$ between said plurality of beverages $B_1, B_2 \ldots B_J$;

F) associating said second beverage $B_2$ with said second tapping valve $V_2$ and storing in said storage means SM a data concerning said second beverage $B_2$ associated with said second tapping valve $V_2$; and G) creating a digital twin associated with said beverage dispenser D through a data group stored in said storage means SM, wherein said data group comprises:

a data concerning said selected geographical area $A_1$, $A_2 \ldots A_N$ and/or a data concerning said selected site $S_{11}, S_{12} \ldots S_{1M}; S_{21}, S_{22} \ldots S_{2M}; S_{N1}, S_{N2} \ldots S_{NM}$, a data concerning said at least one a first unique identification code associated with said first tapping valve $V_1$, a data concerning said at least one second unique identification code associated with said second tapping valve $V_2$, a data concerning said first beverage $B_1$ associated with said first tapping valve $V_1$, and a data concerning said second beverage $B_2$ associated with said second tapping valve $V_2$.

Furthermore, the step A can comprises the following sub-step:

A1) storing in said storage means SM a number equal to the total number of tapping valves included in said beverage dispenser D.

If the step A of the method comprises the sub-step A1, the data group mentioned in step G can comprise said total number of tapping valves.

With reference to step A, a plurality of sets of parameters are stored in said storage means SM.

Said plurality of sets of parameters comprises at least one first set of parameters associated with the first beverage $B_1$ comprising one or more parameters, and a second set of parameters associated with the second beverage $B_2$ comprising one or more parameters.

With reference to step C of the method, said step G can comprise the sub-step of selecting said first set of parameters associated with the first beverage $B_1$, and with reference to the step E of the method, said step E can comprise the sub-step of selecting said second set of parameters associated with the second beverage $B_2$.

Furthermore, said method can comprise the following steps:

modifying one or more parameters of said first set of parameters stored in said storage means SM, so that said one or more modified parameters of said first set of parameters are stored in said storage means SM, and/or modifying one or more parameters of said second set of parameters stored in said storage means SM, so that said one or more modified parameters of said second set of parameters are stored in said storage means SM.

With reference to step G, said data group can comprise said one or more modified parameters of said first set of parameters and/or said one or more modified parameters of said second set of parameters.

Said cloud server SC can comprise a control logic unit U connected to said storage means SM and configured to:

modifying said one or more parameters of said first set of parameters, and/or modifying said one or more parameters of said second set of parameters.

Advantageously, the control system of embodiments of the disclosure allow to control one or more tapping valves of a beverage dispenser by means of a simple structure and ensuring a secure exchange of information between the telematic communication network and said one or more tapping valves.

The present disclosure has been described for illustrative, but not limitative purposes, according to its preferred embodiment, but it is to be understood that variations and/or modifications can be carried out by a skilled in the art, without departing from the scope thereof, as defined according to enclosed claims.

What is claimed is:

1. A control system for controlling one or more tapping valves included in a beverage dispenser, wherein said beverage dispenser comprises a plurality of tapping valves comprising at least one first tapping valve and a second tapping valve, wherein said first tapping valve comprises a first control logic unit and first storage in which at least one unique identification code associated with said first tapping valve and a first set of parameters are stored, and said second tapping valve comprises a second control logic unit and second storage in which at least one second unique identification code associated with said second tapping valve and a second set of parameters, said control system comprising:

a communication network comprising a cloud server comprising in turn a control logic unit and a storage in which at least one said first unique identification code and said second unique identification code are stored, a gateway configured to select said first tapping valve or said second tapping valve and connect said communication network to said first tapping valve or to said second tapping valve, wherein the control logic unit of said cloud server is configured to:

send a control signal to said gateway, regardless of whether said control signal is directed to said first tapping valve or to said second tapping valve, wherein said control signal contains:

a data packet comprising:

at least one data referred to said first unique identification code, one or more data of the following data group: a first command for the first tapping valve, one or more data referred to respective parameters to be modified, one or more data referred to respective further parameters to be added to said first set of parameters, or a further data packet comprising the following data:

at least one data referred to said second unique identification code, one or more data of the following data group:

a data referred to a second command for the second tapping valve, one or more data referred to respective parameters to be modified, one or more data referred to respective further parameters to be added to said second set of parameters, said gateway comprises a further control logic unit configured to:

verify if said control signal is directed to said first tapping valve through said first unique identification code or to said second tapping valve through said second unique identification code, and forward said control signal to said first tapping valve or to said second tapping valve based on an outcome of verification of the unique identification code, the first control logic unit of said first tapping valve is configured to:

receive said control signal sent by the control logic unit of said cloud server through said gateway, and perform said first command and/or modify one or more parameters of the first set of parameters and/or add one or more further parameters to said first set of parameters;

the second control logic unit of said second tapping valve is configured to:
- receive said control signal sent by the control logic unit of said cloud server through said gateway, and
- perform said second command and/or modify one or more parameters of the second set of parameters and/or add one or more further parameters to said second set of parameters.

2. The control system according to claim 1, wherein:
- a first pairing key and a second pairing key are stored in said storage of said cloud server,
- wherein said gateway comprises further storage and said further control logic unit of said gateway is configured to:
  - send a request signal to said cloud server to obtain said first pairing key and said second pairing key,
  - receive a request signal sent from said cloud server, wherein said request signal contains said first pairing key and said second pairing key,
  - establish a connection between said gateway and the first control logic unit of the first tapping valve through said first pairing key and establish a connection between said gateway and the second control logic unit of the second tapping valve through said second pairing key,
- said control logic unit of said cloud server is configured to:
  - receive said request signal sent from said gateway,
  - send to said gateway said request signal containing said first pairing key and said second pairing key.

3. The control system according to claim 2, wherein said further control logic unit of said gateway is configured to store in said further storage the data of said data packet and the data of said further data packet, when it receives said control signal sent from said cloud server.

4. The control system according to claim 1, wherein said connection between said gateway and said first tapping valve is a wireless connection and the connection between said gateway and said second tapping valve is a wireless connection.

5. The control system according to claim 1, wherein the connection between said gateway and said first tapping valve is a Bluetooth connection, and wherein the connection between said gateway and said second tapping valve is a Bluetooth connection.

6. The control system according to claim 1, wherein:
- a first unlock code is stored in said first storage of said first tapping valve, said first unlock code serving to enable said first tapping valve to receive one or more predetermined first commands from said cloud server,
- wherein a second unlock code is stored in said second storage of said second tapping valve, said second unlock code serving to enable said second tapping valve to receive one or more predetermined second commands from said cloud server.

7. The control system according to claim 1, wherein said first unique identification code is a first serial number or a first MAC address and said second unique identification code is a second serial number or a second MAC address.

8. The control system according to claim 1, wherein said gateway is installed on said first tapping valve.

9. The control system according to claim 1, wherein:
- said control signal is an encrypted signal,
- a first decryption key for decrypting said control signal is stored in said first storage,
- a second decryption key for decrypting said control signal, different from said first decryption key, is stored in said second storage,
- said first decryption key and said second decryption key are stored in said storage of said cloud server,
- wherein:
  - said first control logic unit of said first tapping valve is configured to decrypt said control signal through said first decrypting key, when said control signal is directed to the first tapping valve, and
  - said second control logic unit of said second tapping valve is configured to decrypt said control signal through said second decrypting key, when said control signal is directed to the second tapping valve.

10. The control system according to claim 1, wherein a digital twin associated with said beverage dispenser is stored in said storage of said cloud server.

* * * * *